United States Patent [19]

Kunz et al.

[11] Patent Number: 4,925,218

[45] Date of Patent: May 15, 1990

[54] DOUBLE-WALLED PIPELINE SYSTEM

[75] Inventors: Peter Kunz; Heinz Hunger; Jörg Wermelinger, all of Schaffhausen, Switzerland

[73] Assignee: Georg Fischer AG, Schaffhausen, Switzerland

[21] Appl. No.: 270,954

[22] Filed: Nov. 14, 1988

[30] Foreign Application Priority Data

Nov. 11, 1987 [CH] Switzerland .......................... 4399/87

[51] Int. Cl.⁵ .............................................. F16L 35/00
[52] U.S. Cl. ...................................... 285/93; 285/138; 285/156; 285/373; 285/906; 285/915
[58] Field of Search .............. 285/373, 138, 93, 133.1, 285/156, 906, 915

[56] References Cited

U.S. PATENT DOCUMENTS

| 3,954,288 | 5/1976 | Smith | 285/93 |
| 4,488,739 | 12/1984 | deLange | 285/373 X |
| 4,667,505 | 5/1987 | Sharp | 284/373 X |
| 4,786,088 | 11/1988 | Ziu | 265/138 |

Primary Examiner—Dave W. Arola
Attorney, Agent, or Firm—Toren, McGeady & Associates

[57] ABSTRACT

A double-walled pipeline system for flow media with an inner pipeline conduit including fittings, such as, T-pieces, angles, or bends, and instruments, such as, valves, stopcocks, etc., and with an outer pipeline conduit arranged concentrically to the inner pipeline conduit. The outer pipeline conduit includes two-part fittings and instrument casings, so that continuously connected outer annular space is formed in the pipeline system.

12 Claims, 2 Drawing Sheets

DOUBLE-WALLED PIPELINE SYSTEM

BACKGROUND OF THE INVENTION

1. Field of the Invention

The present invention relates to a double-walled pipeline system for flow media with an inner pipeline conduit including fittings, such as, T-pieces, angles, or bends, and instruments, such as, valves, stopcocks, etc., and with an outer pipeline conduit arranged concentrically to the inner pipeline conduit.

2. Description of the Related Art

For conducting hazardous or combustible media in the chemical industry, the pharmaceutical industry or a related industry, frequently safety pipeline systems are required which have an inner pipeline conduit which conducts the medium and an outer pipeline conduit, so that, when the inner pipeline conduit breaks or leaks, the medium can be collected in the outer pipeline conduit in order to avoid accidents or failures.

DE-A1-19 54 371 discloses a pipe arrangement with an inner pipe and an outer pipe which are connected to instruments or other machine parts by means of common end connecting means in the form of clamping ring connections. The end connecting means are provided with an outlet connected to the outer pipe. The outlet is connected, for example, to a container for collecting leaked media. This pipe arrangement has the disadvantage that no continuously connected outer pipeline conduit is provided and that a large number of leakage lines are required in the case of an extensive pipeline system with many connections at fittings and instruments.

It is, therefore, the primary object of the present invention to provide a pipeline system of the above-described type in which a continuous connection of the outer pipeline conduit is ensured even at fittings in the form of T-pieces or angles and at instruments.

SUMMARY OF THE INVENTION

In accordance with the present invention, the outer pipeline conduit includes two-part fittings and instrument casings, so that a continuously connected outer annular space is formed in the pipeline system.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
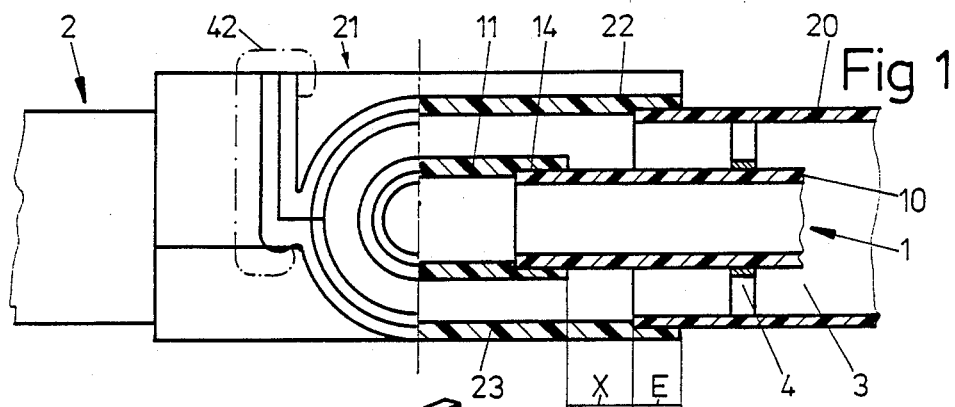
FIG. 1 is a partial sectional view of a portion of a double-walled pipeline system with a T-fitting.

The portion of a double-walled pipeline system according to the present invention shown in FIG. 1 of the drawing includes an inner pipeline conduit 1 and outer pipeline conduit 2.

Figure 2:
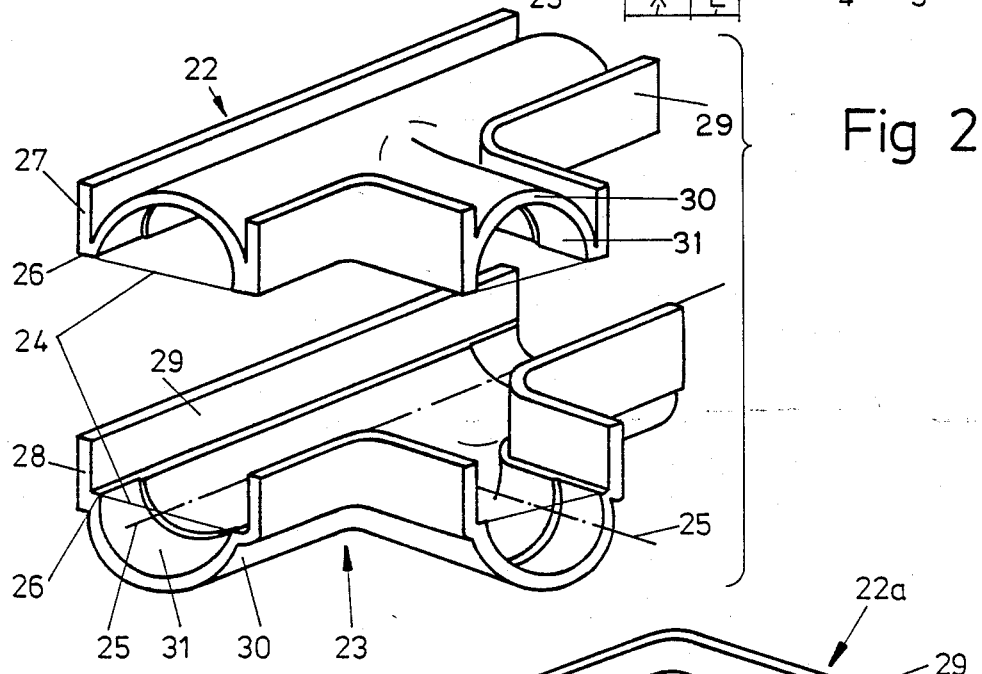
FIG. 2 is a perspective view of two halves of the outer T-fitting of FIG. 1.
Figure 4:
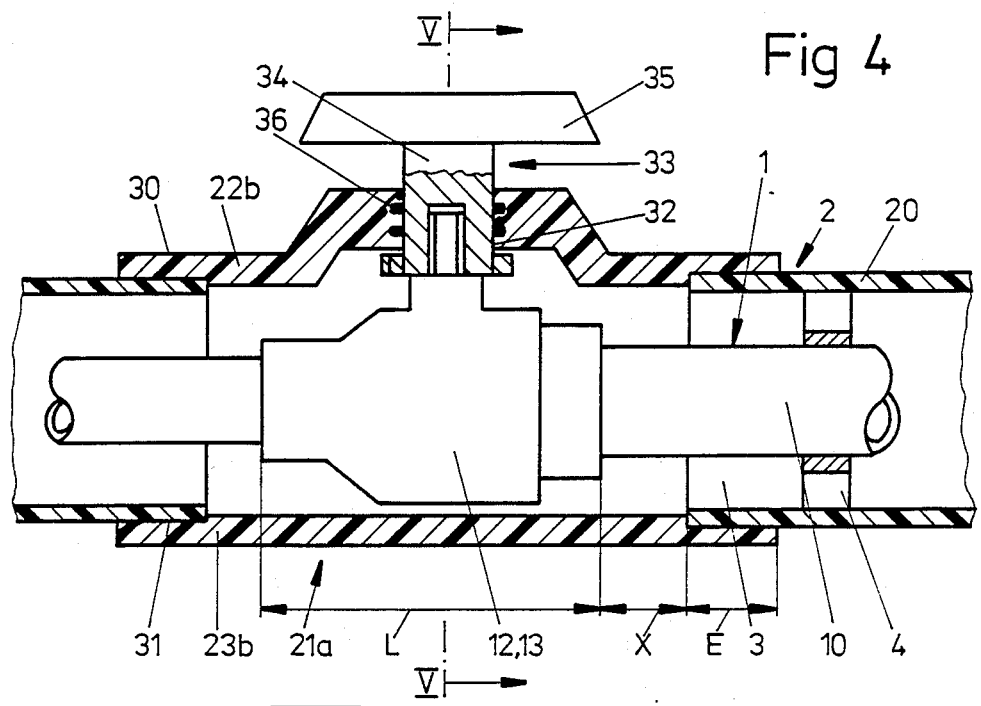
FIG. 4 is a partial longitudinal sectional view of a double-walled pipeline system with an instrument in the form of a stopcock.

The inner pipeline conduit includes plastic pipes 10, fittings 11, for example, a T-piece shown in FIG. 2, and an instrument 12, for example, a stopcock 13 shown in FIG. 4. These components of the inner pipeline conduit correspond to the pipes, fittings and instruments as they are used in conventional simple pipeline systems.

The connections between the pipes 10 and the fittings 11 and instruments 12 may be non-detachable, welded or glued connections 14 or releasable screwed or clamped connections.

The outer pipe conduit 2 has plastic pipes 20 which are arranged concentrically with the pipes 10 Spacers 4 are provided for maintaining the concentric position. The outer pipeline conduit 2 also has fittings 21 which are composed of two half shells 22 and 23.

FIG. 2 of the drawing shows the two half shells 22, 23 in the form of T-pieces prior to their assembly in the pipeline system.

The separating plane 24 between the two half shells extends through the axes 25 of the pipes 20 to be connected. Each half shell 22, 23 has a contact surface 26 extending in the separating plane 24. At the outer edges of the contact surfaces 26 are provided webs 27, 28 which extend vertically or almost vertically relative to the separating plane. When the two half shells are joined, the web 27 of the upper half shell 22 is located within the web 28 of the lower half shell 23, so that the outer surface of the web 27 and the inner surface of the web 28 form connecting surfaces 29. For connecting the half shells 22, 23 to the pipes 20, the half shells 22, 23 have sleeve portions 30 with semi-cylindrical connecting surfaces 31.

The half shells 22, 23 are connected to each other and to the inserted pipes 20 by gluing. The connecting is effected by means of a synthetic adhesive and the large connecting surfaces 29, 31 ensure a sufficient strength of the glued connections. The connection between the half shells and the pipes may also be effected by means of welding. For bracing the two half shells 22, 23 together, a clamp 42, as shown in dash-dotted lines in FIG. 1, may be arranged during gluing so as to surround the webs 27, 28.

The radius of the semi-cylindrical connecting surface and the length E of insertion for the outer pipe 20 are dimensioned in such a way that an optimum welded or glued connection with the pipe 20 is ensured. The glued connection is provided with a strength for the same rated pressure as the pipe 20 which is preferably a standard pipe. The wall thicknesses of the sleeve portions 30 and in the region between the sleeve portions 30 are also selected in accordance with the rated pressure of the pipes 20.

Figure 3:
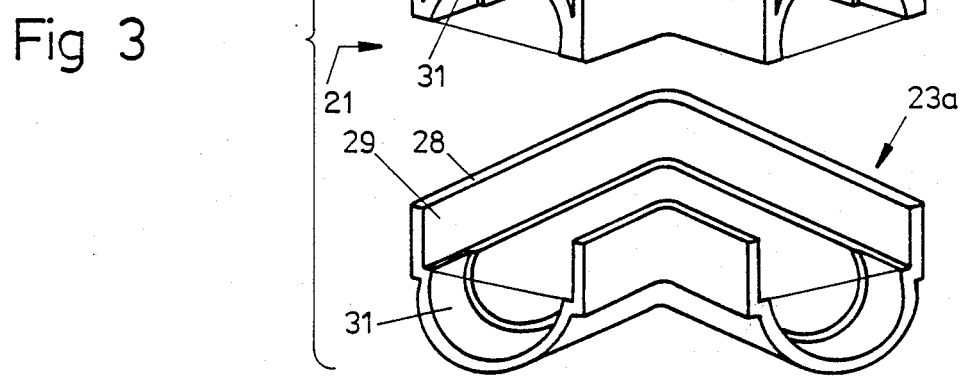
FIG. 3 is a perspective view of two halves of an angle fitting.

FIG. 3 of the drawing shows a two-part fitting 21 in the form of a L-shaped angle. Fitting 21 also is composed of two half shells 22a and 23a and the construction of the connecting surfaces 29, 31 and webs 27, 28 correspond to that of the T-shaped fitting shown in FIG. 2.

Figure 5:
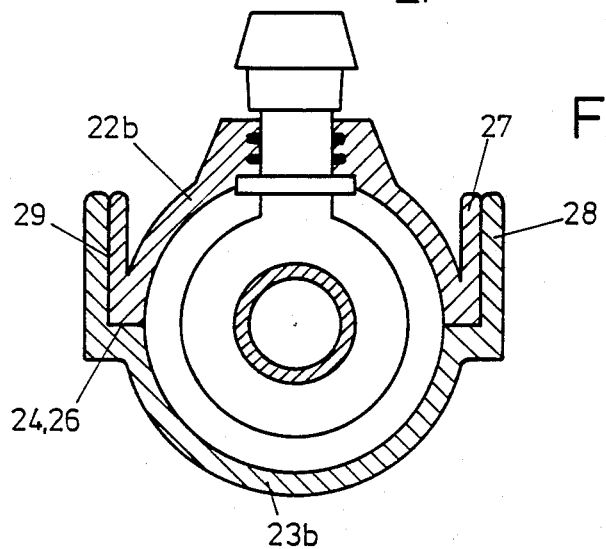
FIG. 5 is a sectional view taken along sectional line V-V of FIG. 4.

FIGS. 4 and 5 of the drawing show a portion of the double-walled pipeline system according to the present invention with an instrument 12 arranged in the inner pipeline conduit 1. In the illustrated example, the instrument is a manually operated, commercially available stopcock 13. The outer pipeline conduit 2 has between the two pipes 20 a two-part instrument casing 21a which is composed of two half shells 22b and 23b. Separating plane 24, contact surfaces 26, webs 27 and 28, sleeve portions 30 and connecting surfaces 29 and 31 are constructed in the same manner as in the fitting 21 described with respect to FIG. 2. One of the two half shells 22b has a passage opening 32 for an actuating device 33 of the stopcock 13.

For using a conventional stopcock 13, the actuating device 33 includes an additional coupling piece 34 on which a handle 35 is arranged. Seals 36 ar arranged in the opening 32 to seal the pipeline system toward the outside.

The fittings constructed as half shells and the casings for the instruments form a continuously connected outer annular space 3. Thus, when leakages or failures occur at fittings, instruments or pipes of the inner pipeline conduit 1, the medium leaked into the space 3 can flow through the entire system and may have to be discharged possibly only at one location.

It is also possible to arrange probes for indicating leakages into the space 3. The probes may be operatively connected to a warning system.

It is also possible to make the pipes 20 of the outer pipe conduit 2 of a transparent material, for example, of plexiglass or clear PVC, so that leakages can be immediately recognized.

As can be seen in FIGS. 1 and 4, the length of the half shells 22, 23 along the pipeline axis 25 on each side of the pipe connection is greater by the insertion length E of the outer pipe 20 plus a distance x than the corresponding length L of the fitting 11 or instrument 12 of the inner pipe conduit 1.

Accordingly, it is easily possible to prepare the welded or glued connections of the pipes 10 with the fittings 11 and the instruments 12 even though, prior to the assembly, the outer pipe 20 has already been placed over the pipe 10.

After the inner pipe conduit 1 has been assembled, the preassembled outer pipes 20 can be connected to form the outer continuous pipe conduit 2 by mounting the half shells 22, 23 in the regions of the fittings 11 and the instruments 12. As mentioned above, the half shells are constructed to provide excellent glued or welded connections.

Figure 6:
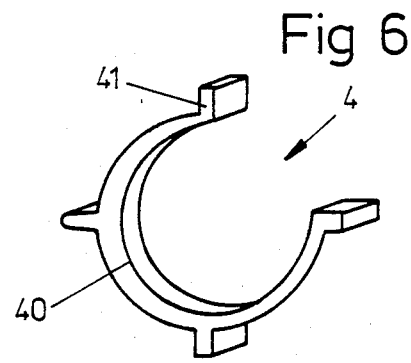
FIG. 6 is a perspective view of a spacer shown in FIGS. 1 and 4.

FIG. 6 of the drawing shows a spacer 4 which can be placed on the pipes 10 of the inner conduit 1 and ensures the coaxial position of the pipe 20. The spacer 4 has a resiliently expandable clamping ring 40 which surrounds at least two-thirds of the pipe circumference, preferably three-fourths of the pipe circumference. The clamping ring 40 has at least three, preferably four, radially outwardly directed webs 41 which are uniformly distributed over the circumference and hold the outer pipe 20 with slight play.

The double-walled pipeline system according to the present invention provides the following advantages:

thermal expansion of the inner pipe conduit is possible independently of the outer pipe conduit;

the inner pipe conduit may be made of existing and proven products;

standard pipes can be used for the outer pipeline conduit;

optimum connections at the inner pipeline conduit are possible;

simple and subsequent mounting of the outer fittings constructed as half shells and of the instrument casings is possible;

new molds are only required for the half shells, so that low investments for the molds are required; and the inner pipe conduit and the outer pipe conduit can be manufactured independently of each other of the respectively most advantageous plastics material.

While a specific embodiment of the invention has been shown and described in detail to illustrate the application of the inventive principles, it will be understood that the invention may be embodied otherwise without departing from such principles.

We claim:

1. A double-walled pipeline system for media comprising an inner pipeline conduit and an outer pipeline conduit arranged concentrically to the inner pipeline conduit, the inner pipeline conduit including fittings and instruments, the outer pipeline conduit having two-part fittings and instrument casings mounted such that a continuously connected outer annular space is formed surrounding the inner pipeline conduit, wherein the two-part fittings and instrument casings are each composed of two half shells, the outer pipeline conduit including pipes, the half shells being fixedly connected to each other and to the outer pipes by means of one of glued and welded connections, and wherein each half shell includes a sleeve portion with a semi-cylindrical connecting surface, the connecting surface having a radius adapted to an outer pipe, an outer pipe being inserted in the sleeve portion and being connected to the sleeve portion by one of a welded and a glued connection, the connection having a strength sufficient for the same rated pressure as the pipe.

2. The pipeline system according to claim 1, wherein each half shell includes connecting surfaces, the half shells contacting each other along a separating plane, the connecting surfaces being arranged on webs extending essentially vertically relative to the separating plane.

3. The pipeline system according to claim 1, wherein each half shell has a contact surface extending in the separating plane.

4. The pipeline system according to claim 1, wherein each half shell has along each pipeline axis on each side of a pipe connection a length which is greater at least by the length of insertion of the outer pipe in the half shell than the corresponding length of the fitting or instrument arranged within the half shells.

5. The pipeline system according to claim 1, wherein at least one of the half shells forming a casing for an instrument has an opening for an actuating device of the instrument.

6. The pipeline system according to claim 1, wherein spacers are provided on pipes of the inner pipeline conduit.

7. The pipeline system according to claim 6, wherein each spacer includes a resiliently expandable clamping ring which surrounds from 2/3 to ¾ of the circumfence, at least three radially outwardly directed webs being arranged on the clamping ring for supporting the outer pipeline conduit.

8. The pipeline system according to claim 7, wherein four webs are arranged on the clamping ring.

9. The pipeline system according to claim 1, wherein the inner pipeline conduit includes inner pipes, the fittings of the inner pipeline conduits being connected to the inner pipes by one of a welded and a glued connection.

10. The pipeline system according to claim 1, comprising probes for determining leakages of the flow media arranged in the space defined between the inner and outer pipeline conduits, the probes being operatively connected to a warning system.

11. The pipeline system according to claim 1, wherein the fittings are selected from the group consisting of T-pieces, angles and bends.

12. The pipeline system according to claim 1, wherein the instruments are selected from the group consisting of valves and stopcocks.

* * * * *